(12) United States Patent
Clapie et al.

(10) Patent No.: US 10,900,409 B2
(45) Date of Patent: Jan. 26, 2021

(54) AIR FLOW CONTROL DEVICE FOR AN ENGINE BLOCK IN A MOTOR VEHICLE

(71) Applicant: Flex-N-Gate Germany GmbH, Neuburg Allemagne (DE)

(72) Inventors: Yann Clapie, Stammham (DE); Bertrand Thoulouze, Gaimersheim (DE); Daniel Eichlinger, Hepberg (DE)

(73) Assignee: FLEX-N-GATE GERMANY GMBH, Neuburg Allemagne (DE)

( * ) Notice: Subject to any disclaimer, the term of this patent is extended or adjusted under 35 U.S.C. 154(b) by 55 days.

(21) Appl. No.: 15/995,991

(22) Filed: Jun. 1, 2018

(65) Prior Publication Data
US 2018/0347449 A1 Dec. 6, 2018

(30) Foreign Application Priority Data
Jun. 2, 2017 (EP) .................................... 17174396

(51) Int. Cl.
*F01P 11/10* (2006.01)
*B60K 11/06* (2006.01)
*B60K 11/08* (2006.01)
*F01P 3/18* (2006.01)

(52) U.S. Cl.
CPC .............. *F01P 11/10* (2013.01); *B60K 11/06* (2013.01); *B60K 11/085* (2013.01); *F01P 3/18* (2013.01)

(58) Field of Classification Search
CPC ......... F01P 11/10; B60K 11/085; B60K 11/06
See application file for complete search history.

(56) References Cited

U.S. PATENT DOCUMENTS

| 8,181,727 | B2 | 5/2012 | Ritz et al. | |
|---|---|---|---|---|
| 9,914,351 | B2* | 3/2018 | Kim .................... | B60K 11/085 |
| 10,017,048 | B2* | 7/2018 | Manhire .............. | B60K 11/085 |
| 2009/0266312 | A1 | 10/2009 | Preiss | |
| 2013/0223980 | A1* | 8/2013 | Pastrick .............. | B60K 11/085 |
| | | | | 415/1 |

(Continued)

FOREIGN PATENT DOCUMENTS

| DE | 3836374 A1 | 1/1990 |
|---|---|---|
| DE | 202011000454 U1 | 5/2011 |
| DE | 102012015519 A1 | 2/2014 |

(Continued)

OTHER PUBLICATIONS

International Search Report for European application No. EP17174396.6, dated Sep. 21, 2017, 2 pages.

*Primary Examiner* — Leonard R Leo
(74) *Attorney, Agent, or Firm* — Reising Ethington P.C.

(57) ABSTRACT

A device for controlling an air flow in a motor vehicle compartment. The device includes: a frame defining an opening; a plurality of slats extending across the frame, arranged above one another; and an actuator connected to each of the slats by a respective fastener. Each slat extends in a respective air deflection plane, and is movable via the actuator, between: a closed position, in which the slats cooperate with one another to block the passage of the air through the opening, and an open position, in which the slats allow the air to flow through the opening, the deflection planes of the slats intersecting upstream from the frame. Each fastener is mounted rotatably only on the actuator, around a respective actuating axis.

3 Claims, 3 Drawing Sheets

(56) References Cited

U.S. PATENT DOCUMENTS

2013/0248265 A1    9/2013  Wolf

FOREIGN PATENT DOCUMENTS

| EP | 1270286 A2 | 1/2003 |
| FR | 2930481 A1 | 10/2009 |
| FR | 2997346 A1 | 5/2014 |
| WO | WO2014064083 A1 | 5/2014 |

* cited by examiner

AIR FLOW CONTROL DEVICE FOR AN ENGINE BLOCK IN A MOTOR VEHICLE

TECHNICAL FIELD

The present invention relates to an air flow control device in a motor vehicle compartment, the device comprising:
- at least one frame defining an opening, the frame extending in a transverse plane, the opening extending along a flow axis of the air substantially perpendicular to the transverse plane;
- a plurality of slats extending across the frame, the slats being arranged above one another; and
- an actuator connected to each of the slats by a respective fastener;
- each slat extending in a respective air deflection plane, and each slat being movable relative to the frame around a respective slat axis, using the actuator, between:
- a closed position, in which the slats cooperate with one another to block the passage of the air through the opening, and
- an open position, in which the slats allow the air to flow through the opening, and in which the deflection planes of the slats intersect one another upstream from the frame relative to the flow axis of the air flow.

The invention also relates to a motor vehicle comprising such a device.

BACKGROUND

It is necessary for the proper operation of motor vehicles to cool the engine to prevent it from overheating. To that end, most vehicles comprise an aeration duct opening on the front face and conveying surrounding air to a radiator. The air flow cools a heat transfer liquid circulating in the radiator and the engine, dissipating part of the heat produced by the engine.

In order to control the cooling optimally, it is known to use a system for closing and opening the aeration duct, for example including inclinable fins.

This system makes it possible to control the air flow going toward the radiator by opening the duct more or less when cooling is necessary, and closing it to stop the cooling, which makes it possible to reduce the heating time of the engine during startup and to decrease the fuel consumption, in particular in the winter.

Furthermore, when the speed of the vehicle is significant, the air flow in the aeration duct is high enough to disrupt the flow of air in the location where it is discharged from the vehicle and to create a significant drag force, which may slow the vehicle. It is then useful to limit the flow of air in the duct by closing it partially.

Flow control devices comprising rotatable fins are thus advantageous, since they allow improved control of the air flow reaching the radiator, since they can assume several intermediate configurations between complete closing and complete opening.

It is known, for example from document FR 2 997 346, to improve these devices by arranging the slats in an array in the open position to optimize the diffusion of the air. Indeed, the air traversing the air flow control device when the latter is open is then distributed homogeneously over the entire working surface of the radiator. The working section of the radiator is in fact generally larger than the section of the duct, and only a reduced part of the radiator is cooled with the prior devices in which the fins extend parallel to one another.

These devices can be further improved. Indeed, the opening and closing kinematics of such a device with an array of slats are complex, and require the use of an actuator with oblong holes. Such a part is complex to manufacture, and may prove sensitive to use, the actuator being able to break or the orifices being able to become dirty, which disrupts the proper operation of the device.

SUMMARY

One aim of the invention is to effectively cool the engine of the vehicle without increasing the quantity of air circulating through the flow control device, while using a simple and robust part to have optimal longevity.

To that end, the invention relates to a device of the aforementioned type, characterized in that each fastener is mounted rotatably only on the actuator, around a respective actuating axis.

Such a device makes it possible to have a more effective distribution of the air flow traversing the aeration duct, over the entire working surface of the radiator located downstream, and thus to cool the engine more effectively, while remaining easy to manufacture and robust to use, since it does not require articulating the fins in specific holes provided on the actuator.

According to alternative embodiments, the device according to the invention has one or more of the following features, considered individually or according to any technically possible combination:
- the actuating axes of the slats are arranged on a curved line at least when the slats are in the open position;
- when the slats are in the closed position, the actuator extends substantially rectilinearly, and when the slats are in the closed position, the actuator extends over a curved line;
- the actuator is a strip comprising flexible segments;
- the actuating axes of the slats are arranged on a curved line, translated when the slats move between the closed position and the open position;
- the actuator comprises at least two segments with different lengths, each segment having one end connected to one of the fasteners;
- the plurality of slats comprises a lower slat, the deflection plane of the lower slat forming a substantially right angle with the transverse plane, when the lower slat is in the open position, the plurality of slats further comprising at least one upper slat, the deflection plane of each upper slat forming a non-right angle with the transverse plane, when the upper slat is in the open position;
- the deflection plane of each upper slat forms a same separation angle with the deflection plane of the slat located directly below; and
- each slat has a nonzero separation distance between the slat axis and the actuating axis, the separation distance of each slat being greater than the separation distance of the slat located directly below.

The invention also relates to a motor vehicle comprising a device as defined above, comprising a compartment, the compartment containing an engine and a radiator mounted on the engine, the compartment defining a duct for conveying air to the radiator, the vehicle additionally comprising a device as defined above arranged through the duct, regulating the flow of air through the duct.

BRIEF DESCRIPTION OF THE DRAWINGS

The invention will be better understood upon reading the following description, provided solely as an example and done in reference to the appended drawings, in which.

DETAILED DESCRIPTION OF THE ILLUSTRATED EMBODIMENTS

Figure 1:
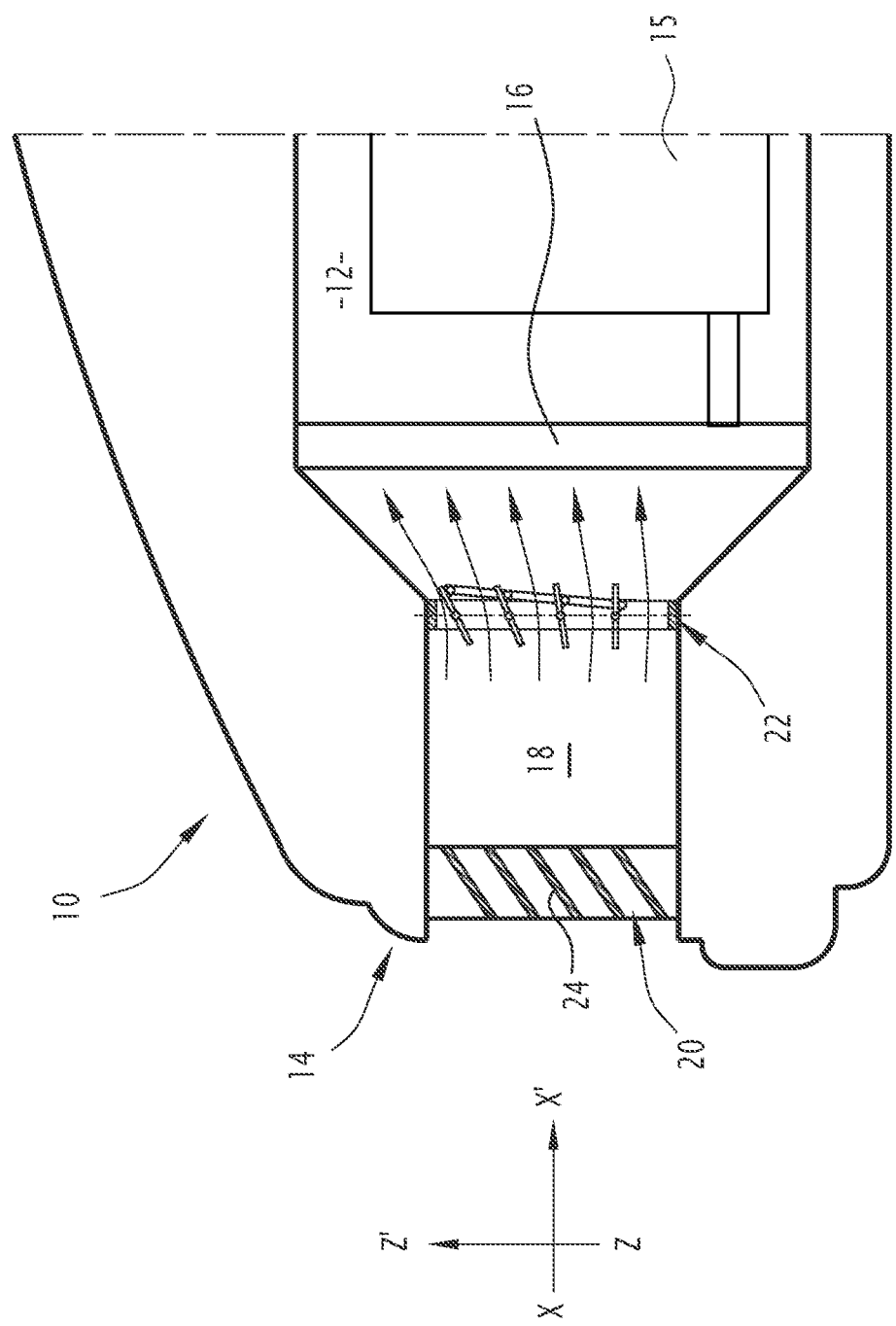
FIG. 1 is a sectional view of a front block of a motor vehicle comprising an air flow control device according to one embodiment of the invention.

A motor vehicle 10, partially shown in FIG. 1, comprises a compartment 12 having a front face 14 and containing an engine 15 equipped with a radiator 16. Hereinafter, the terms "front", "rear", "top", "bottom", "vertical", "horizontal", "transverse" and "longitudinal" are used in reference to the normal movement direction of the motor vehicle 10 under normal conditions.

The vehicle 10 is propelled by the engine, the latter generating heat during its operation.

The radiator 16 is arranged near the engine, and a heat transfer fluid flows between the engine and the radiator 16, to transmit the heat produced by the engine to the radiator 16. The radiator 16 eliminates part of the heat received in the ambient air, in particular by convection and radiation.

A duct 18 opens in the front face 14 and is arranged to convey air through the compartment 12 to the radiator 16. A flow of air flows in the duct 18 under the effect of the convection taking place around the radiator 16, which causes a call for air. The flow rate of the air flow increases with the speed of the motor vehicle 10 when the latter moves.

The duct 18 extends along a longitudinal flow axis X of the air. The duct 18 for example has a rectangular section. Hereinafter, the terms upstream and downstream will be used relative to the flow direction of the air flow in the duct 18, from the front face 14 toward the radiator 16.

A grate 20 extends across the duct 18 at the front face 14, and an air flow control device 22 is installed in the duct 18 downstream from the grate 20.

The grate 20 comprises a plurality of bars 24 extending across the duct 18, arranged to prevent bulky objects from penetrating the duct 18 while allowing the air to flow through the grate 20 from outside the vehicle.

The device 22 is suitable for controlling the air flow flowing in the duct 18 toward the radiator 16. A first embodiment of the device 22 is shown in detail in FIGS. 2 and 3.

The device 22 comprises a frame 30, a plurality of slats 32 arranged across the frame 30, and an actuator 34 of the slats 32. In the illustrated example, the device 22 comprises four identical slats 32. Alternatively, the device 22 comprises another number of slats 32, for example between two and twelve slats 32.

The frame 30 is a substantially rectangular structure, which extends along the walls of the duct 18 along a transverse plane YZ orthogonal to the flow axis of the air X-X'. The frame 30 defines an opening 36 with a substantially rectangular section in the transverse plane YZ, such that the opening 36 extends across the frame 30, along the air flow axis X-X'.

The slats 32 extend through the frame 30 in a transverse direction Y-Y' substantially orthogonal to the air flow axis X-X'. The slats 32 are arranged above one another, aligned in an elevation direction Z-Z' orthogonal to the air flow axis X-X' and the transverse direction Y-Y'. Each slat 32 has one or two adjacent slats 32, i.e., located immediately above or below it. The transverse direction Y-Y' is for example horizontal and the elevation direction Z-Z' is for example vertical.

The plurality of slats 32 comprises a lower slat 32 and at least one upper slat 32, for example three upper slats 32 in the illustrated embodiment. The lower slat 32 is the lowermost slat 32 in the elevation direction Z-Z'. The upper slats 32 are the slats 32 located above the lower slat 32 in the elevation direction Z-Z'.

Each slat 32 extends in a respective air deflection plane 38, along which the slat 32 reorients part of the air flow traversing the frame 30. Thus, when the air flow slides over the slat 32, it is reoriented along the deflection plane 38.

Each slat 32 is mounted rotatably around a respective slat axis 40 relative to the frame 30.

The actuator 34 is an elongate connecting rod connected to each of the slats 32 by a fastener 41, protruding from the slat 32. The actuator 34 is arranged to move the slats between a closed position shown in FIG. 2 and an open position shown in FIG. 3.

In the closed position, the slats 32 cooperate with one another to block the flow of air through the opening 36. In other words, in the closed position, each slat 32 is in contact with each adjacent slat 32, so as to prevent the passage of air between the two slats 32, and the slats 32 close the frame 30.

In the open position, the slats 32 allow the air to flow through the opening 36. In other words, in the open position, each slat 32 is separated from each adjacent slat 32, so as to leave an air flow space free between the two slats 32.

The actuator 34 is articulated to each slat 32 by a pivot link located at one end of the fastener 41, around a respective actuating axis 42. The articulation of the fastener 41 on the actuator 34 is done solely in rotation around the actuating axis 42. This means that the actuating axis 42 is not translatable relative to the actuator 34.

The actuating axis 42 is offset relative to the slat axis 40 such that a longitudinal translation of the actuator 34 drives the rotation of each slat 32 around its respective slat axis 40. The actuating axis 42 and the slat axis 40 are parallel to one another, and separated by a separating distance e.

Figure 2:
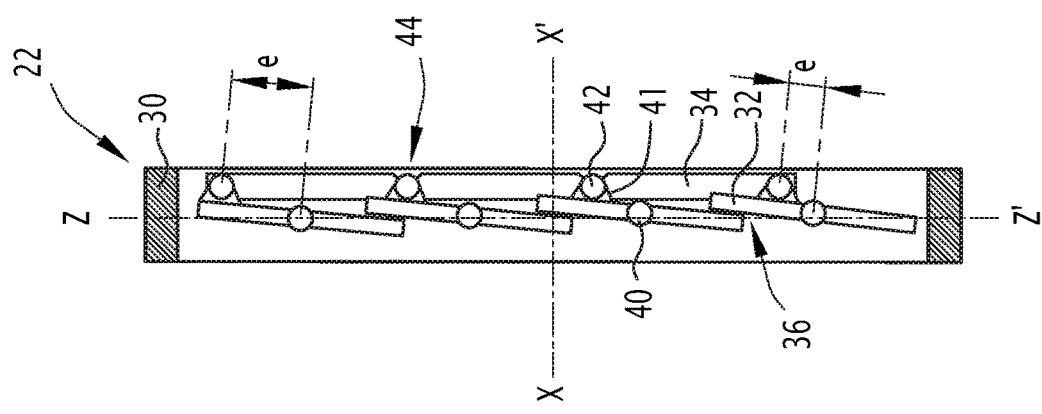
FIG. 2 is a sectional view of the control device of FIG. 1, when fins are in the closed position.

The separating distance e of each upper slat 32 is greater than the separating distance e of the slat 32 located directly below, as shown in FIG. 2.

The slats 32 are arranged, when they are in the open position, to distribute the air flow toward the radiator 16. The deflection planes 38 of the slats 32 are not parallel, but intersect one another upstream from the frame 30, such that the slats 32 are arranged in an array in the open position.

In the illustrated example, the deflection plane of the lower slat 32 forms a right angle with the transverse plane YZ, and the deflection planes of the upper slats 32 form non-right angles with the transverse plane YZ.

Advantageously, each deflection plane 38 intersects the deflection plane(s) 38 of the adjacent slats 32 by a same separation angle $\alpha$. For example, the separation angle $\alpha$ is comprised between 5° and 20°, in particular equal to 10°.

Figure 3:
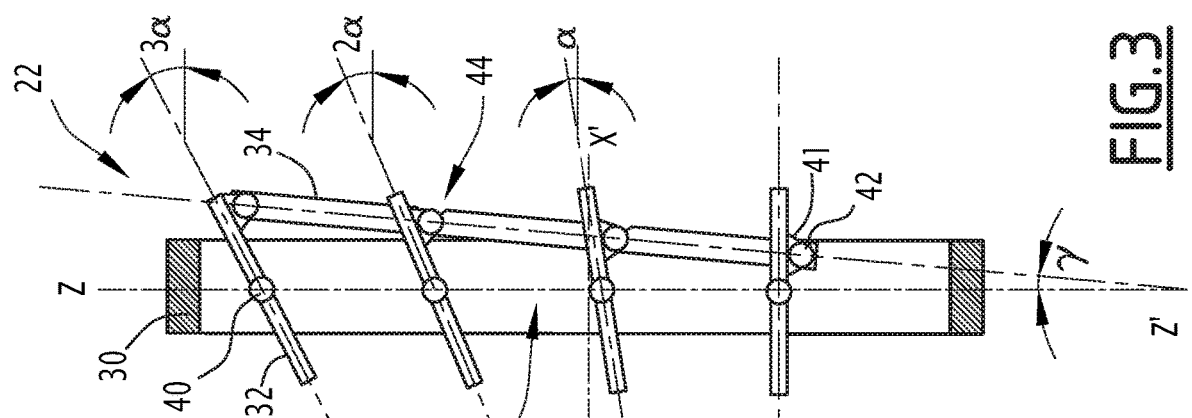
FIG. 3 is a sectional view of the control device of FIGS. 1 and 2, when fins are in the open position.

In the first embodiment of FIGS. 2 and 3, the actuator 34 is suitable for deforming when the slats 32 go from the closed position to the open position.

Indeed, the arrangement of the slats 32 in the open position and the linear nature of the actuator 34 make the passage kinematics from the closed position to the open position hyperstatic. The flexibility of the actuator 34 makes it possible to offset this problem without using more complex systems, like those including oblong holes.

The actuator 34 is for example a strip comprising flexible segments 44 along its expanse, to allow an easier deformation. The flexible segments 44 are for example located at actuating axes 42 of some of the slats 32, for example at the second and third slat 32 in the example shown in FIGS. 2 and 3.

The flexible segments 44 for example have a reduced section, made using a notch or groove in the section of the actuator 34.

The actuator 34 extends substantially rectilinearly when the slats 32 are in the closed position and extends along a curved line when the slats 32 are in the open position.

Thus, the actuating axes 42 of the slats 32 are aligned in the elevation direction Z-Z' when the slats 32 are in the closed position, and arranged along the curved line when the slats 32 are in the open position. This means that the actuating axes 42 are not aligned in a plane XZ orthogonal to the slat axes 40, when the slats 32 are in the open position.

The curved line is for example an arc of circle.

In the illustrated example, the actuating axes 42 of the second and third slat 32 are offset in the downstream direction by the deformation of the actuator 34, when the slats 32 are in the open position. In other words, the actuating axes 42 of the second and third slats 32 are located at a non-zero distance, for example comprised between 0.2 mm and 0.4 mm, from the line passing through the actuating axes 42 of the first and fourth slats 32.

In this embodiment, the actuator 34 extends substantially rectilinearly and parallel to the transverse plane YZ when the slats 32 are in the closed position, and along the curved line when the slats 32 are in the open position, the curved line intersecting the transverse plane along a nonzero incline angle γ, in particular comprised between 3° and 15°.

A second embodiment of the device 22, shown in FIGS. 4 and 5, will now be described. This second embodiment is similar to the first embodiment described above, with the exception of the differences described below.

Figure 5:
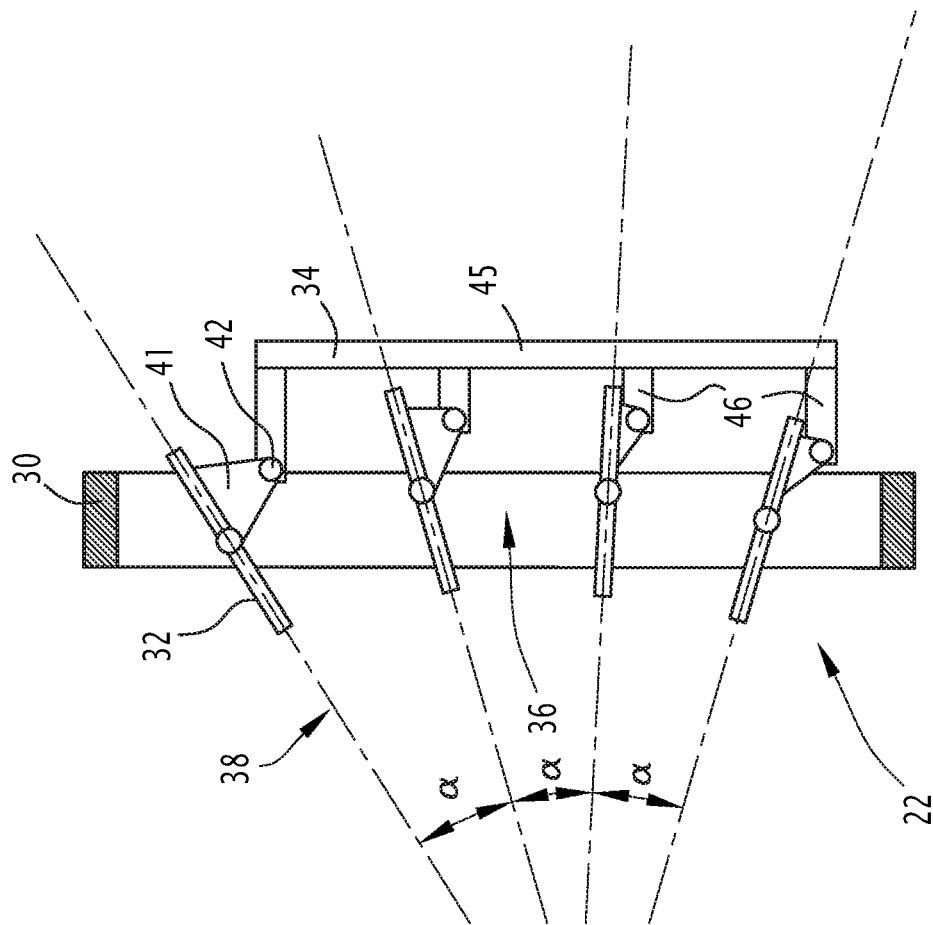
FIGS. 4 and 5 are detailed sectional views of another embodiment of the device according to the invention, respectively in the closed and open positions.
Figure 4:
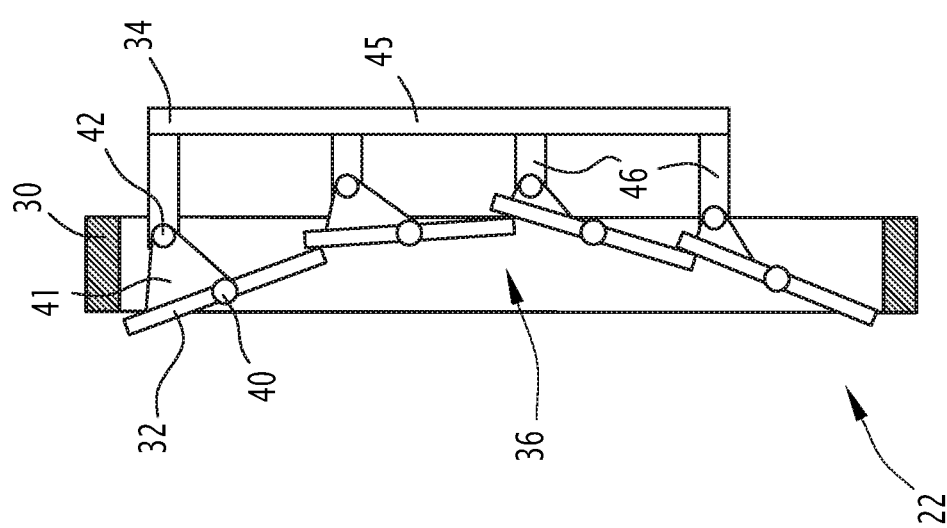

In the second embodiment, the actuator 34 does not deform significantly when the slats 32 go from the closed position shown in FIG. 4 to the open position shown in FIG. 5.

In the second embodiment, the slat axes 40 are not aligned in a direction parallel to the transverse plane YZ, but are arranged along a curved line, for example with the slat axes 40 of the second and third slats 32 located further downstream than the slat axes 40 of the first and fourth slats 32.

Furthermore, the actuating axes 42 of the slats 32 are arranged along a same curved line, translated when the slats 32 go from the open position to the closed position and vice versa. In other words, each of the actuating axes 42 follows the same translation when the slats 32 are moved from the open position to the closed position or vice versa.

In the illustrated example, the actuator 34 comprises a main segment 45 and a plurality of secondary segments 46 connected substantially orthogonally to the main segment 45 by a first end. The secondary segments 46 are articulated to the fasteners 41 at their other end, around actuating axes 42. The secondary segments 46 have different lengths from one another.

The main segment 45 extends substantially parallel to the transverse plane YZ, and the secondary segments 46 extend substantially orthogonally to the transverse plane YZ, when the slats 32 are in the closed position and when they are in the open position.

The described device 22 makes it possible to have a more effective distribution of the air flow traversing the duct 18, over the entire working surface of the radiator 16 located downstream, and thus to cool the engine more effectively. The device 22 remains easy to manufacture and robust to use, in particular owing to the shape and flexibility of the actuator 34.

The invention claimed is:

1. A device for controlling an air flow in a motor vehicle compartment, the device comprising:
   at least one frame defining an opening, the frame extending in a transverse plane, the opening extending along a flow axis of the air substantially perpendicular to the transverse plane;
   a plurality of slats extending across the frame, the slats being arranged above one another; and
   an actuator connected to each of the slats by a respective fastener;
   each slat extending in a respective air deflection plane, and each slat being movable relative to the frame around a respective slat axis, using the actuator, between:
      a closed position, in which the slats cooperate with one another to block the passage of the air through the opening, and
      an open position, in which the slats allow the air to flow through the opening, and in which the deflection planes of the slats intersect one another upstream from the frame relative to the flow axis of the air flow,
   wherein each fastener is mounted rotatably only on the actuator, around a respective actuating axis,
   wherein the actuating axes are arranged on a curved line, translated when the slats move between the closed position and the open position, and
   wherein the actuator comprises at least two segments with different lengths, each segment having one end connected to one of the fasteners.

2. The device according to claim 1, wherein the actuating axes are arranged on a curved line at least when the slats are in the open position.

3. A motor vehicle comprising a compartment, the compartment containing an engine and a radiator mounted on the engine, the compartment defining a duct for conveying air to the radiator, the vehicle additionally comprising a device according to claim 1 arranged through the duct, regulating the flow of air through the duct.

* * * * *